United States Patent [19]

Tomlinson et al.

[11] 4,354,347
[45] Oct. 19, 1982

[54] COMBINED CYCLE SYSTEM FOR OPTIMIZING CYCLE EFFICIENCY HAVING VARYING SULFUR CONTENT FUELS

[75] Inventors: Leroy O. Tomlinson, Schenectady, N.Y.; Richard T. Cuscino, North Andover, Mass.

[73] Assignee: General Electric Company, Lynn, Mass.

[21] Appl. No.: 155,473

[22] Filed: Jun. 2, 1980

[51] Int. Cl.³ .............................................. F02G 5/02
[52] U.S. Cl. ................................ 60/39.18 B; 60/616; 60/672
[58] Field of Search ...................... 60/39.02, 646, 657, 60/39.18 B

[56] References Cited

U.S. PATENT DOCUMENTS

| | | | |
|---|---|---|---|
| 3,009,325 | 11/1961 | Pirsh | 60/657 |
| 3,220,193 | 11/1965 | Strohmeyer | 60/646 |
| 3,953,966 | 5/1976 | Martz et al. | 60/39.18 B |
| 4,099,384 | 7/1978 | Stevens et al. | 60/657 |
| 4,207,842 | 6/1980 | Kehlhofer | 122/406 |
| 4,242,989 | 1/1981 | Chamberlain | 122/451 |
| 4,311,013 | 1/1982 | Kuribayashi | 60/646 |

FOREIGN PATENT DOCUMENTS 1076541  7/1967  United Kingdom .
1095372 12/1967  United Kingdom .
1519973  8/1978  United Kingdom .

Primary Examiner—Louis J. Casaregola
Assistant Examiner—Donald A. Kearney
Attorney, Agent, or Firm—James W. Mitchell

[57] ABSTRACT

This disclosure is directed toward combined cycle power plants which include at least one gas turbine and one steam turbine thermally coupled through a heat recovery steam generator (HRSG). Exhaust gas from the gas turbine is used to heat feedwater into steam for the steam turbine. One optimum criterion is to design the HRSG so that the exit temperature of the exhaust gas is at a minimum without the occurrence of sulfur condensation on the economizer tube bundles. The allowable minimum temperature varies with the sulfur content of the fuel and, hence, it would be desirable to be able to adjust the tube surface temperature as necessary in accordance with the sulfur content of the gas turbine fuel.

1 Claim, 2 Drawing Figures

COMBINED CYCLE SYSTEM FOR OPTIMIZING CYCLE EFFICIENCY HAVING VARYING SULFUR CONTENT FUELS

BACKGROUND OF THE INVENTION

This invention relates, in general, to combined cycle power plants and, in particular, to an improvement in cycle arrangement for optimizing power plant efficiency and providing adaptability to gas turbine fuels having varying sulfur content.

A combined cycle power plant utilizes a gas turbine and a steam turbine in combination to output power, typically electric power. The power plant is arranged so that the gas turbine is thermally connected to the steam turbine by means of a heat recovery steam generator (HRSG). The HRSG is a noncontact heat exchanger which allows feedwater for the steam generation process to be heated by otherwise wasted gas turbine exhaust gases. The HRSG is a large stack with tube bundles interposed therein whereby water is heated to steam as exhaust gases are passed through the stack. The primary efficiency of the combined cycle arrangement is, of course, due to the utilization of otherwise wasted gas turbine exhaust gases.

One key parameter in optimizing the combined cycle efficiency is that the highest efficiency is achieved with the lowest stack gas temperature at the outlet end of the exhaust gas stack. The lower limit on stack gas temperature is usually proscribed by the sulfur content in the gas turbine fuel. This is because sulfur compounds condense on the tube bundles at certain relatively low temperatures causing severe corrosion on the tube bundles. It is also known that the dew point of the corrosive sulfur compounds increases with increased concentration of sulfur in the fuel.

The conventional method for optimizing a combined cycle plant efficiency is to design the HRSG and steam system to operate with a stack gas temperature that would prevent low temperature heat transfer surface corrosion commensurate with the highest level of sulfur content in the fuel expected to be burned in the specific application. If fuel is burned with lower fuel sulfur content, the HRSG stack gas temperature cannot be lowered to improve efficiency although the sulfur compound concentration would allow it. Conversely, if the HRSG were designed with stack gas temperature commensurate with the lowest fuel sulfur content to be expected, the plant efficiency would be improved; however, the HRSG heat transfer surface would experience corrosion if the fuel with higher sulfur content were burned.

The HRSG includes a plurality of interconnected tube bundles which may be identified from top to bottom as a low pressure economizer, a high pressure economizer, an evaporator and a superheater. The HRSG heat exchange process is a counterflow process in that the temperature of the hot exhaust gases decreases as they rise in the stack whereas the temperature of the steam water mixture in the tubes increases as it descends downwardly against the upward flow of hot exhaust gases.

SUMMARY OF THE INVENTION

In the foregoing arrangement, since the critical parameter is the lowest temperature, then the area where condensation is most likely to occur is in the low pressure economizer at the top of the stack where the feedwater enters the HRSG and the hot gas exits the HRSG after flowing through and releasing heat in the heat exchanger tube bundles. It is now more or less conventional to utilize a feedwater conditioning device known as a deaerator to take oxygen from the feedwater and thereby reduce its tendency to rust the water-carrying pipes. A flash tank may also be used in combination with the deaerator to preheat the feedwater. The flash tank receives its energy from the low pressure economizer. It has been found that the sulfur corrosion process can be minimized for fuels having varying sulfur content by controlling the temperature of the feedwater in combination with the deaerator operating pressure. Excess steam occurring as a result of this procedure may be input into the steam turbine at a downstream stage having a pressure less than the steam pressure at the flash tank.

OBJECTS OF THE INVENTION

It is an object of the present invention to prevent the occurrence of sulfur corrosion in an HRSG.

It is another object of the present invention to improve the economy of a combined cycle power plant.

It is still another object of the present invention to render some flexibility into the fuel selection possibilities of a combined cycle power plant.

The novel features believed characteristic of the present invention are set forth in the appended claims. The invention itself, however, together with further objects and advantages thereof, may best be understood with reference to the following description taken in connection with the drawings.

DETAILED DESCRIPTION OF THE INVENTION

Figure 1:
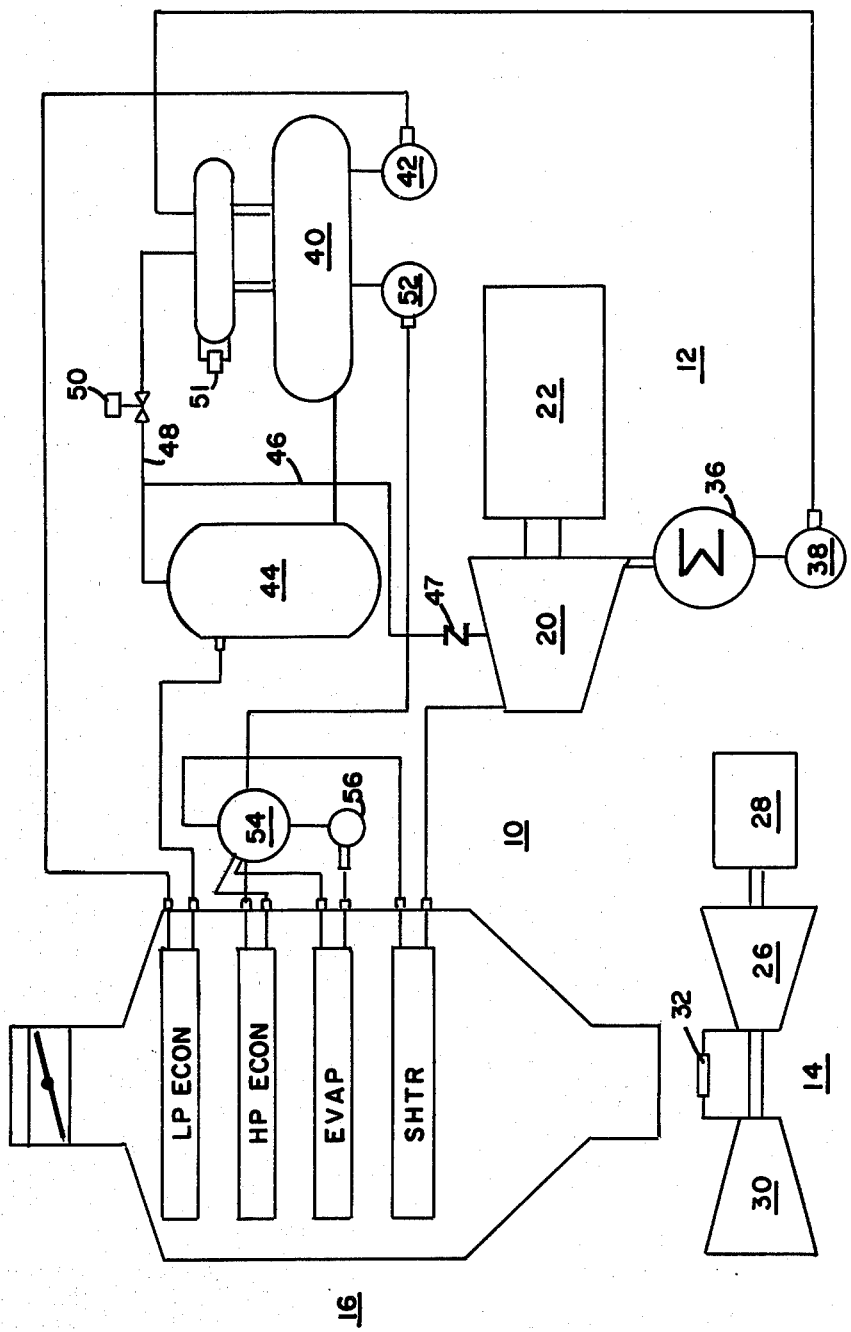
FIG. 1 is a schematic drawing of a combined cycle plant showing the present invention incorporated therein.

FIG. 1 depicts a combined cycle power plant 10 in schematic form. A steam turbine-generator power plant 12 is thermally conjoined with a gas turbine power plant 14 through a heat recovery steam generator (HRSG) 16. The steam turbine-generator power plant 12 includes a steam turbine 20 drivingly connected to an electrical generator 22. The gas turbine power plant includes a gas turbine 26 drivingly connected to an electrical generator 28 and furthermore connected to drive a compressor 30. The compressor draws in ambient air and feeds it into a combustor annulus 32 (only one shown) which ignites a fuel-air mixture for driving the gas turbine. The exhaust gas from the gas turbine is introduced into the HRSG 16 in order to produce steam for the steam turbine.

The heat recovery steam generator, for purposes of illustrating the present invention, includes four heating stages or modules: a low pressure economizer, a high pressure economizer, an evaporator and a superheater. The preceding recitation represents the order of feedwater flow from condensate to superheated vapor from top to bottom in the HRSG. Hence, as condensate travels down the HRSG to be changed into superheated steam, the hot exhaust gas rises in the HRSG and as the heat transfer takes place, the temperature of the gas decreases. The most critical region in terms of sulfur condensation in the HRSG is in the low pressure economizer tube bundle because the gas temperature is at its lowest point as well as the condensate water temperature. The present invention will maintain the surface temperature of the tube bundle at a minimum level to prevent corrosion despite varying levels of sulfur content in the fuel.

Referring to FIG. 1 in further detail, the exhaust steam from the steam turbine is condensed and collected in steam condenser 36 whereupon it is pumped by condensate pump 38 to a direct contact heat exchanger called a deaerating feedwater heater 40. As the name implies, the heat exchanger is also a deaerator which removes air from the feedwater so as to minimize corrosion in the tube bundles. Also it should be kept in mind that the FIG. 1 showing of the combined cycle power plant is intended to be schematic with well known controls removed so as to clarify the nature of the present invention over the prior art.

Water is drafted fro the deaerator heater 40 by means of pump 42 and sent to the inlet end of the low pressure economizer. Specifically, the temperature of the tube surface of the low pressure economizer is the subject matter of the present invention as will be pointed out with reference to FIG. 2. The water output of the low pressure economizer is input into a flash tank 44. Flash tank 44 produces steam by dropping the pressure of the hot water output of the low pressure economizer. A first portion 46 of the flash steam is input into a low pressure admission stage of the steam turbine. A suitable nonreturn valve 47 prevents steam from being extracted from the steam turbine. A second portion 48 of the flash steam is input into the deaerator heater as a temperature/pressure control. The amount of steam available on line 46 is the residual of the steam input into deaerator 40 to satisfy the requirements of the present invention. This relation is maintained by a deaerator pressure control valve 50 which includes the usual pressure sensing transducer 51 to provide an actual pressure readout signal which will allow the pressure control valve to be set at a preset pressure in accordance with the known sulfur content of the gas turbine fuel oil. A suitable pressure transducer is an Analog Pressure Controller, manufactured by Foxboro Company of Foxboro, Mass.

Water is also pumped from the deaerating feedwater heater to the high pressure economizer by means of feedwater pump 52. Water is heated in the high pressure economizer and input into a steam drum 54 where it is recirculated by pump 56 through the evaporator and then to the drum and finally through the superheater into the steam turbine.

Figure 2:
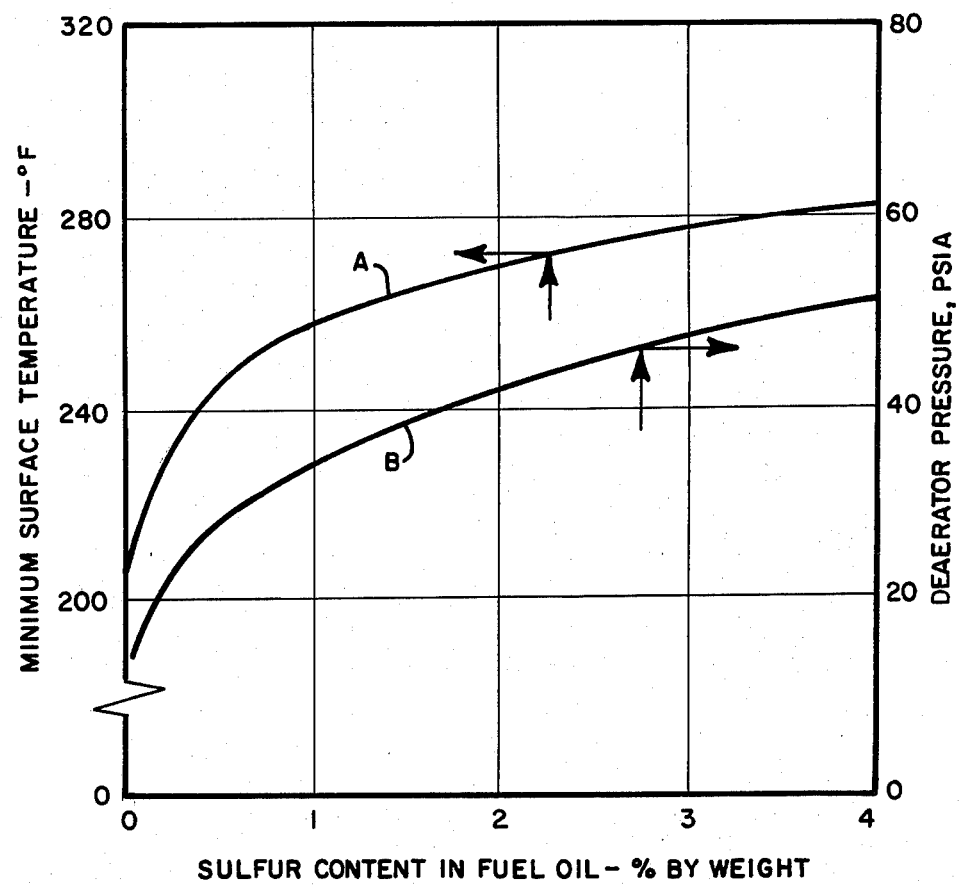
FIG. 2 is a graph showing the relationship between tube bundle surface temperature, deaerator water pressure and the gas turbine fuel sulfur content.

FIG. 2 shows the relationship between the sulfur content in fuel, the minimum tube surface temperature and the minimum deaerator pressure needed to produce the minimum tube surface temperature. The temperature line A shows that at a 2 percent sulfur content, the minimum tube surface temperature should be about 260 degrees F. Also, the pressure line B shows that for the same sulfur content in the fuel; e.g., 2 percent, the deaerator pressure should be on the order of 42 or 43 psia. In order to attain and maintain this value, steam may be diverted from line 46 by varying the opening of valve 50 to increase the pressure in he deaerator and thus cause heat to be added to the feedwater being intput into the low pressure economizer. This then avoids tube sulfur corrosion.

On the other hand, if the sulfur content of the fuel is lower, then the surface temperature of the tube bundle may be decreased by lowering the steam pressure in he deaerator. This may be done by closing the valve 50 a desired amount until the actual pressure equals the preset pressure obtained from FIG. 2. The additional available steam may then be input into the steam turbine on line 46 to increase the output and efficiency of the combined cycle power plant. Hence, the objects of the invention are carried out since sulfur corrosion is obviated, whereas flexibility and higher efficiency are input into the system.

While the present invention is shown as being implemented in a manual mode using a known pressure setting for a known fuel sulfur content, it may also be appreciated that various routine automated schemes may become available to implement this process. It is intended to cover in the appended claims all such modifications and schemes which do not depart from the true spirit and scope of this invention.

What is claimed is:

1. A combined cycle power plant having at least one gas turbin and at least one steam turbine thermally interconnected through at least one heat recovery steam generator, said heat recovery steam generator including at least one economizer section adjacent to the heat recovery steam generator exhaust gas outlet; the power plant further comprising:
   a deaerator heating feedwater to the economizer inlet;
   a flash tank connected to the economizer outlet for producing steam from the economizer effluent;
   a first conduit interconnecting the flash tank and the deaerator;
   a second conduit interconnecting the first conduit with a steam turbine inlet
   a valve disposed in the first conduit for apportioning steam between the deaerator and the steam turbine inlet.

* * * * *